United States Patent
Song et al.

(10) Patent No.: US 9,083,964 B2
(45) Date of Patent: Jul. 14, 2015

(54) STEREOSCOPIC IMAGE DISPLAY DEVICE

(75) Inventors: Myoung-Seop Song, Yongin-si (KR);
Jang-Doo Lee, Yongin-si (KR);
Hyoung-Wook Jang, Yongin-si (KR);
Hag-Keun Kim, Gunpo-si (KR);
Duck-Myung Lee, Seoul (KR);
Han-Jun Choi, Seongnam-si (KR);
Hyun-Sook Kim, Yongin-si (KR);
Woo-Jong Lee, Seoul (KR)

(73) Assignees: Nexuschips Co., Ltd., Seoul (KR);
Samsung Display Co., Ltd., Yongin-si (KR)

( * ) Notice: Subject to any disclaimer, the term of this patent is extended or adjusted under 35 U.S.C. 154(b) by 821 days.

(21) Appl. No.: 11/480,651

(22) Filed: Jul. 3, 2006

(65) Prior Publication Data

US 2007/0008314 A1 Jan. 11, 2007

(30) Foreign Application Priority Data

Jul. 5, 2005 (KR) .................. 10-2005-0060213

(51) Int. Cl.
*H04N 13/04* (2006.01)
*H04N 13/00* (2006.01)
*H04N 13/02* (2006.01)
*H04N 19/597* (2014.01)

(52) U.S. Cl.
CPC ....... *H04N 13/0404* (2013.01); *H04N 13/0048* (2013.01); *H04N 13/0055* (2013.01); *H04N 13/0409* (2013.01); *H04N 13/0452* (2013.01); *H04N 13/0296* (2013.01); *H04N 13/0497* (2013.01); *H04N 19/597* (2014.11)

(58) Field of Classification Search
None
See application file for complete search history.

(56) References Cited

U.S. PATENT DOCUMENTS 5,432,720 A * 7/1995 Lucente et al. .......... 361/679.27
6,313,866 B1 * 11/2001 Akamatsu et al. ............... 348/51
6,496,183 B1 12/2002 Bar-Nahum
(Continued)

FOREIGN PATENT DOCUMENTS

DE 200 22 456 U1 11/2001
EP 1 406 456 A2 4/2004
(Continued)

OTHER PUBLICATIONS

European Search Report dated Oct. 24, 2006 for 06116599.9 in the name of Samsung SDI Co., Ltd.
(Continued)

*Primary Examiner* — Said Broome
(74) *Attorney, Agent, or Firm* — Christie, Parker & Hale, LLP

(57) ABSTRACT

A stereoscopic image display device includes: a display unit including a plurality of pixels arranged in a matrix format, the pixels including left-eye and right-eye pixels alternately arranged in one direction; a memory including a left-eye image area for storing left-eye image data corresponding to the left-eye pixels and a right-eye image area for storing right-eye image data corresponding to the right-eye pixels; an address comparator for the respectively storing the left-eye and right-eye image data at corresponding addresses of the left-eye and right-eye image areas and making an arrangement of the left-eye and right-eye image areas in the memory in response to a first signal; a data synthesizer for synthesizing a stereoscopic image signal from the data stored in the memory; and a data driver for applying a data signal corresponding to a stereoscopic image signal to the display unit.

18 Claims, 6 Drawing Sheets

(56) References Cited

U.S. PATENT DOCUMENTS

| | | | |
|---|---|---|---|
| 2002/0101657 A1* | 8/2002 | Min et al. | 359/462 |
| 2003/0048354 A1* | 3/2003 | Takemoto et al. | 348/51 |
| 2003/0152264 A1* | 8/2003 | Perkins | 382/154 |
| 2004/0036763 A1 | 2/2004 | Swift et al. | |
| 2004/0070667 A1* | 4/2004 | Ando | 348/46 |

FOREIGN PATENT DOCUMENTS

| | | |
|---|---|---|
| JP | 09-159970 | 6/1997 |
| JP | 10-191400 | 7/1998 |
| JP | 2006-018282 | 1/2006 |
| JP | 2006-154809 | 6/2006 |
| KR | 10-2003-0088513 A | 11/2003 |
| KR | 10-2005-0078737 A | 8/2005 |
| WO | WO 97/23097 | 6/1997 |
| WO | WO 2005/013623 A1 | 2/2005 |

OTHER PUBLICATIONS

European Office action dated May 18, 2012, for corresponding European Patent application 06116599.9, (9 pages).

* cited by examiner

STEREOSCOPIC IMAGE DISPLAY DEVICE

CROSS-REFERENCE TO RELATED APPLICATION

This application claims priority to and the benefit of Korean Patent Application No. 10-2005-0060213 filed in the Korean Intellectual Property Office on Jul. 5, 2005, the entire content of which is incorporated herein by reference.

BACKGROUND OF THE INVENTION (a) Field of the Invention

The present invention relates to a stereoscopic image display device, and more particularly to a stereoscopic image display device for realizing a user interface including a stereoscopic image.

(b) Description of the Related Art

A stereoscopic image display device provides a stereoscopic image having a depth effect and a stereoscopic effect without using additional devices, such as polarizing spectacles, since different images are respectively provided to left and right eyes of a user by the stereoscopic image display device.

The stereoscopic image display device uses a space division method in which left-eye and right-eye images displayed on a display panel are respectively divided in a left-eye direction and a right-eye direction by providing a parallax barrier, a lenticular lens, or a microlens array in front of the display panel.

Three dimensional (3D) data is converted into stereoscopic image data in order to realize image data for the stereoscopic image display device. The conversion from the 3D data to the stereoscopic image data is typically performed outside of the stereoscopic image display device.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a stereoscopic image display device capable of converting 3D image data to stereoscopic image data.

An exemplary stereoscopic image display device according to an embodiment of the present invention includes a display unit including a plurality of pixels arranged in a matrix format, the plurality of pixels including left-eye pixels and right-eye pixels alternately arranged in one direction, a memory including a left-eye image area for storing left-eye image data corresponding to the left-eye pixels and a right-eye image area for storing right-eye image data corresponding to the right-eye pixels, an address comparator for respectively storing the left-eye image data and the right-eye image data at corresponding addresses of the left-eye and right-eye image areas and making an arrangement of the left-eye and right-eye image areas in the memory in response to a first signal, a data synthesizer for synthesizing a stereoscopic image signal from the data stored in the memory, and a data driver for applying a data signal corresponding to the stereoscopic image signal to the display unit.

A 3D image-stereoscopic image converter according to another embodiment of the present invention converts 3D image data to stereoscopic image data corresponding to an arrangement of left-eye and right-eye pixels of a display unit. The 3D image-stereoscopic image converter includes: a geometric engine for converting the 3D image data to left-eye 3D image data or right-eye 3D image data in response to a stereoscopic image activation signal; a memory including a left-eye image area for storing left-eye image data corresponding to the left-eye pixels and a right-eye image area for storing right-eye image data corresponding to the right-eye pixels; a rendering engine for recoding the left-eye image data and the right-eye image data at the memory using the spatial information and color information of the left-eye 3D image data and the right-eye 3D image data; an address comparator for respectively storing the left-eye image data and the right-eye image data input from the rendering engine at corresponding addresses of the left-eye and right-eye image areas and changing an arrangement of the left-eye and right-eye image areas in the memory in response to a first signal; and a data synthesizer for synthesizing a stereoscopic image signal from the data stored in the memory.

DETAILED DESCRIPTION

Figure 1:
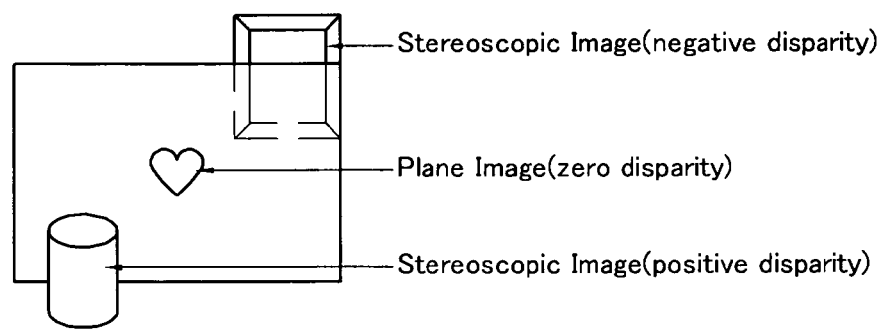
FIG. 1 shows a diagram for representing stereoscopic images seen by an observer according to a disparity.

Exemplary embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

First, a principle for displaying a stereoscopic image will be schematically described before a stereoscopic image display device according to an exemplary embodiment of the present invention, is described.

In general, an observer can perceive different image information on left and right eyes because the left and right eyes see a stereoscopic object from different positions. Accordingly, the observer obtains depth information for the stereoscopic object and perceives a stereoscopic effect by combining the different image information.

The observer may see the stereoscopic image since the stereoscopic image display device provides respective images to be seen by left and right eyes when the observer sees a stereoscopic object.

Here, a difference between the respective images seen by the left and right eyes is referred to as a disparity. In addition, the observer perceives that the stereoscopic object seems to be closer to the observer than a predetermined reference surface when the disparity has a positive (+) value, and the stereoscopic object seems to be farther from the observer than the predetermined reference surface when the disparity has a negative (−) value.

FIG. 1 shows a diagram for representing stereoscopic images seen by an observer according to the disparity. As shown in FIG. 1, the observer perceives that a cylindrical image having a positive disparity seems to be closer than the reference surface and a rectangular object having a negative disparity seems to be farther than the reference surface. In addition, the observer perceives that a heart-shaped image having a zero disparity seems to be on the reference surface. When a surface of a display device is established as the reference surface, the 'stereoscopic image' can hereinafter refer to an image perceived to be closer to the observer than the reference surface or perceived to be farther from the observer than the reference surface. In addition, the 'plane image' can hereinafter refer to an image perceived by the observer to be on the reference surface. In addition, the 'stereoscopic image display device' can hereinafter refer to a display device for displaying a stereoscopic image.

In exemplary embodiments of the present invention, a stereoscopic image display device that can form a stereoscopic effect by separating the left-eye and right-eye images by using a parallax barrier will be described. However, the present invention is not limited to the stereoscopic image display device using a parallax barrier method. For example, embodiments of the present invention can also be applied to a stereoscopic image display device using a lenticular lens method.

A stereoscopic image display device including a liquid crystal display device will be described in more detail with reference to FIG. 2. However, the stereoscopic image display device according to the exemplary embodiments of the present invention may be applied to an organic light emitting diode (OLED) display device, a plasma display device, and/or an electric field display device (e.g., field emission display device or electron emission display device).

Figure 2:
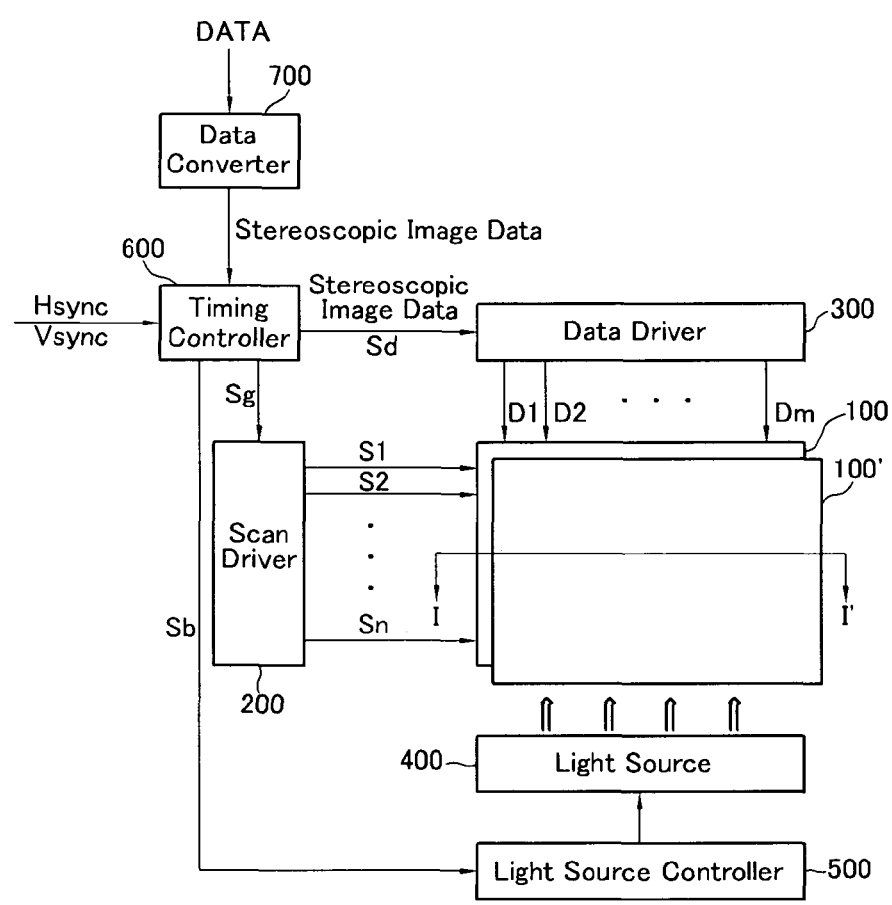
FIG. 2 shows a block diagram of a configuration of a stereoscopic image display device according to an exemplary embodiment of the present invention.

FIG. 2 shows a block diagram of a configuration of a stereoscopic image display device according to an exemplary embodiment of the present invention.

As shown in FIG. 2, the stereoscopic image display device according to the exemplary embodiment of the present invention includes a display unit 100, a barrier 100', a scan driver 200, a data driver 300, a light source 400, a light source controller 500, a timing controller 600, and a data converter 700. While the light source 400 including a surface light source may be formed at a rear surface of the display panel 100, the light source 400 is illustrated as being below the display panel 100 in FIG. 2.

The display panel 100 includes a plurality of scan lines S1 to Sn for transmitting selection signals, a plurality of data lines D1 to Dm insulated from and crossing the plurality of scan lines and for transmitting data signals, and a plurality of subpixels (e.g., shown in FIG. 3) formed at areas defined by the crossings of the scan lines and the data lines. In the exemplary embodiment of the present invention, it is assumed that a red subpixel for displaying red (R) color, a green subpixel for displaying green (G) color, and a blue subpixel for displaying blue (B) color together form each pixel.

In addition, a plurality of pixels of the display panel 100 according to the exemplary embodiment of the present invention includes first pixels corresponding to a left-eye image (hereinafter, referred to as "left-eye pixels"), and second pixels corresponding to a right-eye image (hereinafter, referred to as "right-eye pixels). The respective left-eye and right-eye pixels are alternately arranged. In more detail, the left-eye pixels and the right-eye pixels are alternately arranged in parallel so that the left-eye pixels and the right-eye pixels may be formed in a stripe or a zigzag pattern. The arrangement of the left-eye and right-eye pixels may be appropriately varied according to the configuration of the barrier 100'.

The barrier 100' is disposed on (or near or adjacent to) a surface of the display panel 100, and includes opaque and transparent regions (e.g., shown in FIG. 3) that are arranged corresponding to an arrangement of the left-eye pixels and right-eye pixels of the display panel 100. The barrier 100' respectively provides the left-eye and right-eye images respectively projected from the left-eye and right-eye pixels to left and right eyes of the observer by using the opaque and transparent regions. The opaque and transparent regions of the barrier 100' may be formed in the stripe or the zigzag pattern according to the arrangement of the left-eye and right-eye pixels of the display panel 100.

Figure 3:
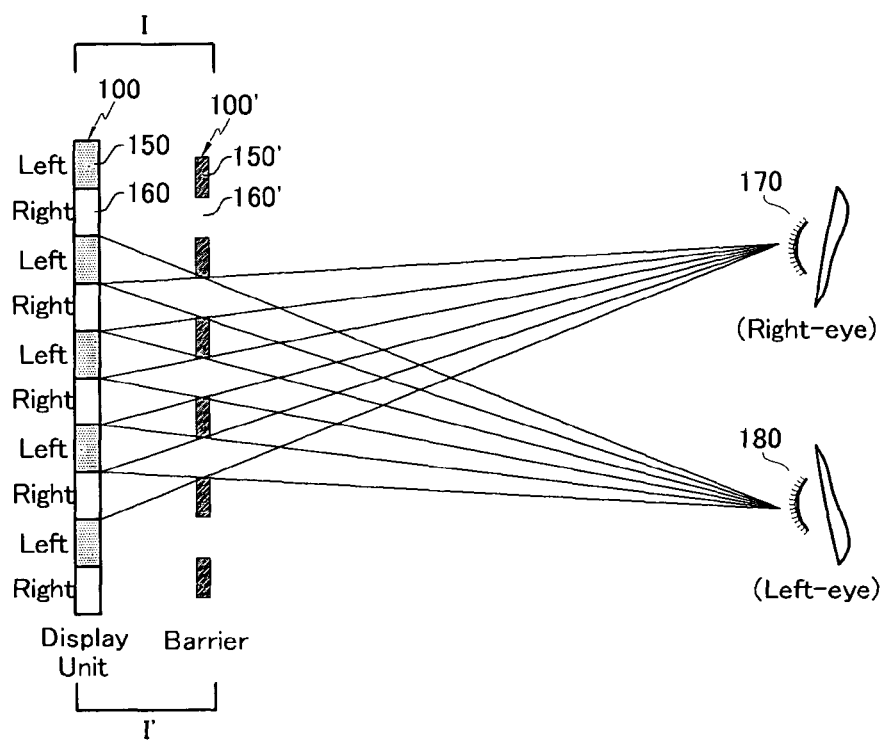
FIG. 3 shows a diagram for representing a stereoscopic image displayed by the stereoscopic image display device shown in FIG. 2.

A method for providing the stereoscopic image to the observer through the display panel 100 and the barrier 100' shown in FIG. 2 will be schematically described with reference to FIG. 3. FIG. 3 shows a sectional view for representing a section I-I' of the display panel 100 and the barrier 100'. The observer observes the stereoscopic image through the left-eye and right-eye pixels on the section I to I'.

As shown in FIG. 3, the display panel 100 includes a plurality of left-eye pixels 150 and a plurality of right-eye pixels 160 alternately arranged thereon, and the barrier 100' includes opaque regions 150' and transparent regions 160' alternately arranged in parallel with the plurality of left-eye pixels 150 and the plurality of right-eye pixels 160. Here, the left-eye and right-eye pixels 150 and 160 may be arranged in a matrix format. The left-eye pixels 150 of the display panel 100 project the left-eye image to a left eye 180 through the transparent regions 160', the right-eye pixels 160 of the display panel 100 project the right-eye image to a right eye 170 through the transparent regions 160' of the barrier 100'. The opaque regions 150' of the barrier 100' form light projection paths so that the left-eye pixels 150 and the right-eye pixels 160 of the display panel 100 may respectively project left-eye and right-eye images to the left and right eyes through the transparent regions 160'.

The left-eye image projected from the left-eye pixels 150 is formed as an image having a predetermined disparity in relation to the right-eye image, and the right-eye image projected from right-eye pixels 160 is formed as an image having another predetermined disparity in relation to the left-eye image. Therefore, when the left and right eyes of the observer perceive the left-eye image projected from the left-eye pixels 150 and the right-eye image projected from the right-eye pixels 160, the observer may perceive the stereoscopic effect since the observer obtains the depth information substantially equal to the depth information of an actual stereoscopic object seen by the left and right eyes.

Referring to FIG. 2, the scan driver 200 sequentially generates selection signals in response to the control signals (Sg) output from the timing controller 600, and applies them to the scan lines S1 to Sn.

The data driver 300 converts data input from the timing controller 600 to data signals and applies the data signals to the data lines D1 to Dm in response to the control signals (Sd) input from the timing controller 600.

The light source 400 includes red (R), green (G), and blue (B) light emitting diodes (not shown), and outputs corresponding red (R), green (G), and blue (B) lights to the display panel 100. The red (R), green (G), and blue (B) light emitting diodes of the light source 400 respectively output the lights to the R, G, and B subpixels of the display panel 100.

The light source controller 500 controls a light emitting timing of the light emitting diodes of the light source 400 in response to the control signal Sb output from the timing controller 600. Here, a period for providing the data signals from the data driver 300 to the data lines and a period for emitting the R, G, and B lights from the R, G, and B light emitting diodes by the light source controller 500 may be synchronized by the control signal provided by the timing controller 600.

The timing controller 600 respectively provides a stereoscopic image signal data input by the data converter 700 and the generated control signals Sg, Sd, and Sb to the scan driver 200, the data driver 300, and the light source controller 500 in response to externally input horizontal synchronization Hsync and vertical synchronization Vsync signals and the stereoscopic image signal data.

The data converter 700 converts input data DATA to stereoscopic image data and transmits the stereoscopic image data to the timing controller 600. In the exemplary embodiment of the present invention, the data DATA input to the data converter 700 is data including 3D image contents (hereinafter, referred to as "3D image data"), and the stereoscopic image data includes left-eye image data and right-eye image data respectively corresponding to the left-eye pixels and right-eye pixels of the display panel 100. In addition, in the exemplary embodiment of the present invention, the 3D image data includes coordinate information (i.e., X and Y coordinate information) and color information of a corresponding coordinate. The data converter 700 for converting the 3D image data for the plane image may be realized in a graphic accelerating chip. In FIG. 2, it is exemplarily shown that the data converter 700 is provided before the timing controller 600. However it should be understood that the present invention is not limited thereto.

Figure 4:
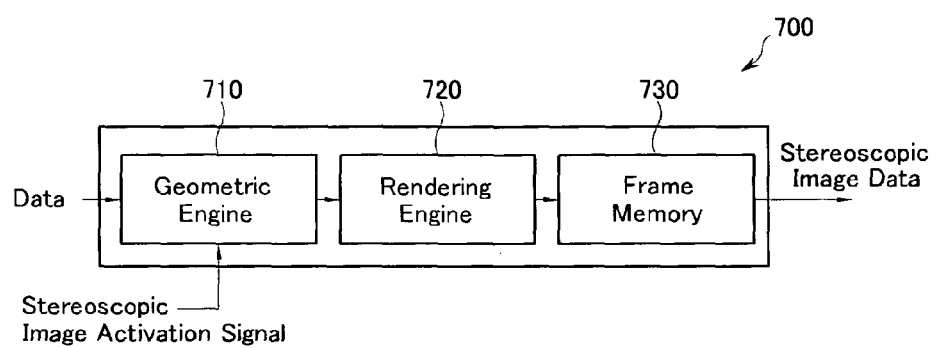
FIG. 4 shows a block diagram of a configuration of a data converter.

Hereinafter, the data converter 700 will be described in more detail with reference to FIG. 4. FIG. 4 shows a block diagram of a configuration of the data converter 700.

As shown in FIG. 4, the data converter 700 according to the exemplary embodiment of the present invention includes a geometric engine 710, a rendering engine 720, and a frame memory unit 730.

In response to a stereoscopic image activation signal, the geometric engine 710 converts the 3D image data into left-eye 3D image data or right-eye 3D image data by operating the 3D image data value with a variable corresponding to a position of the left eye or the right eye, and transmits coordinate information and color information corresponding to the left-eye 3D image data and the right-eye 3D image data to the rendering engine 720. The variable corresponding to the position of the left eye or the right eye includes a model view matrix and a projection matrix for the respective left and right eyes. Parameters corresponding to an observing position (i.e., left eye or right eye) of the 3D image are arranged in the model view matrix, and parameters of perspective for the 3D image are arranged in the projection matrix. In more detail, the geometric engine 710 generates the 3D image data for the left-eye and right-eye image data by performing a matrix multiplying operation of the input 3D image data in the model view matrix and the projection matrix for the respective left and right eyes. When the stereoscopic image activation signal is not applied, the geometric engine 710 converts the input 3D image data into a 3D image for a single eye by operating the 3D image with a variable corresponding to a single position (i.e., the 3D image for single eye as distinguished from 3D images for the left and right eyes) without differentiating it into the 3D image data for the left eye and the 3D image data for the right eye, and transmits coordinate and color information corresponding to the 3D image data for the single eye to the rendering engine 720. In this case, the 3D image data for the single eye may be generated as the plane image data since the 3D image data for the single eye is transmitted through the rendering engine 720 and is overlapped on the left-eye image and right-eye image sections of the frame memory unit 730.

The rendering engine 720 generates the space coordinates and color information for the left-eye and right-eye 3D image data using the space coordinates and color information corresponding to the left-eye and right-eye 3D images, and transmits the generated space coordinates and color information to the frame memory unit 730. In addition, the rendering engine 720 transmits an address signal A (or a write address signal (WA) and a read address signal (RA)), a left/right selection signal (S), and a write activation signal (W) to the frame memory unit 730 such that the frame memory unit 730 records the stereoscopic image data.

In response to the write activation signal (W), the frame memory unit 730 stores the color information corresponding to the coordinates of the left-eye and right-eye 3D image data transmitted from the rendering engine 720 at corresponding addresses of the left-eye and right-eye image areas of the frame memory unit 730. In this embodiment, the color information includes color information or texture coordinate values. In response to the read activation signal (R), the frame memory unit 730 transmits the stored data to the data driver 300.

Figure 5:
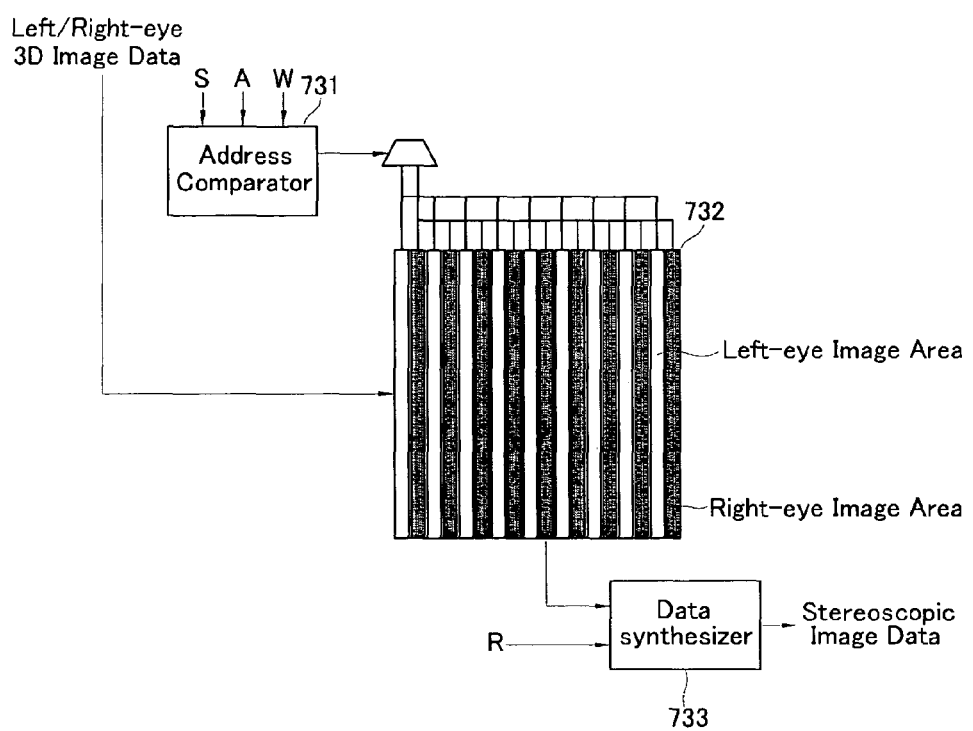
FIG. 5 shows a block diagram of a configuration of a frame memory unit according to an exemplary embodiment of the present invention.
Figure 6:
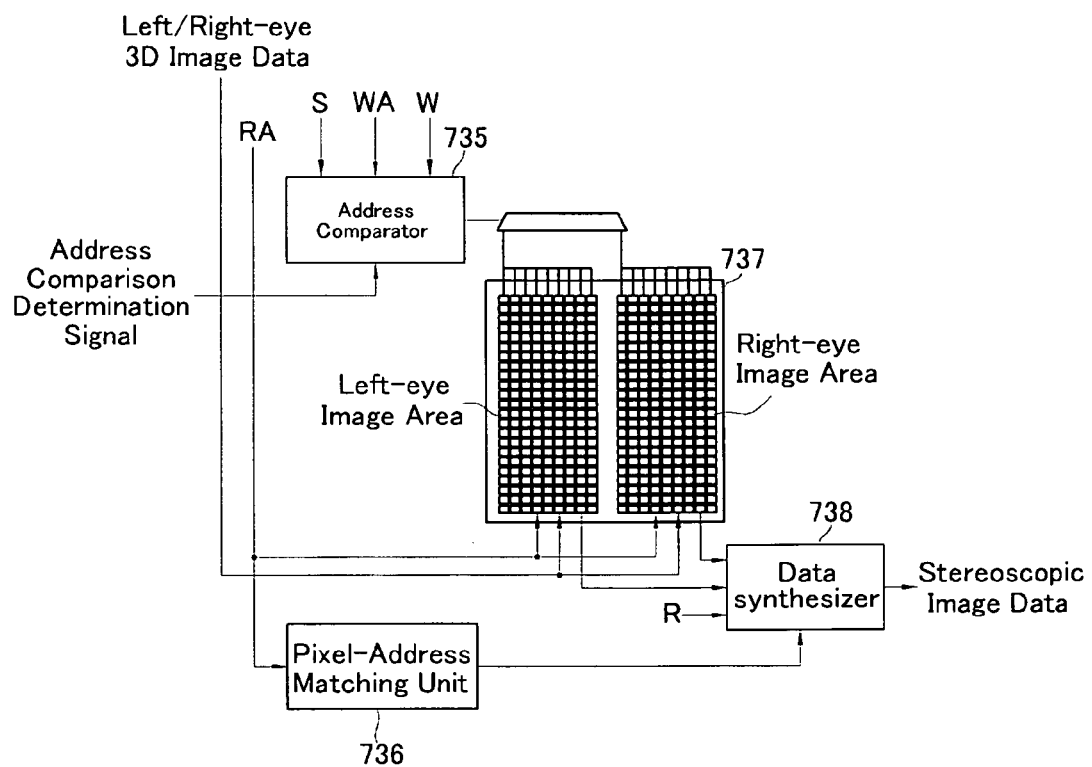
FIG. 6 shows a block diagram of a configuration of a frame memory unit according to another exemplary embodiment of the present invention.

Hereinafter, the frame memory unit 730 will be described in detail with reference to FIG. 5 and FIG. 6. FIG. 5 shows a block diagram of a configuration of a frame memory unit according to an exemplary embodiment of the present invention and FIG. 6 shows a block diagram of a configuration of a frame memory unit according to another exemplary embodiment of the present invention.

First, the frame memory unit of FIG. 5, which can be used as the frame memory unit 730 of FIG. 4, is described.

As shown in FIG. 5, the frame memory unit includes an address comparator 731, a frame memory 732, and a data synthesizer 733.

In response to the address signal A, the address comparator 731 respectively records the input left-eye 3D image data and input right-eye 3D image data at left-eye and right-eye image areas of the frame memory 732. In more detail, in response to the left/right selection signal (S), the address comparator 731 determines where the 3D image data input is recorded among the left-eye and right-eye image areas of the frame memory 732, and applies the write activation signal (W) to the determined left-eye image area or right-eye image area. At this time, the address comparator 731 compares the respective space coordinates of the input left-eye and right-eye 3D image data with the address information of the left-eye and right-eye image areas such that the left-eye 3D image data and the right-eye 3D image data are respectively recorded at addresses corresponding to the left-eye image area and the right-eye image area of the frame memory 732.

The frame memory 732 is formed such that the left-eye and right-eye image areas are alternately and repeatedly arranged. In this case, the left-eye image area stores the left-eye 3D image data and the right-eye image area stores the right-eye 3D image data. It is exemplarily shown in FIG. 5 that the left-eye and right-eye image areas are arranged corresponding to the arrangements of the left-eye and right-eye pixels of the display unit 100, however, it should be understood that the present invention is not limited thereto.

In response to a read activation signal (R), the data synthesizer 733 synthesizes and outputs stereoscopic image data by sequentially reading the left-eye 3D image data and the right-eye 3D image data stored in the frame memory 732, and arranging the read left-eye 3D image data and the right-eye 3D image data in correspondence with the arrangements of the left-eye pixels and the right-eye pixels of the display unit 100.

Now, a frame memory unit according to another exemplary embodiment of the present invention shown in FIG. 6 will be described. The frame memory unit of FIG. 6 can be used as the frame memory unit 730 of FIG. 4.

As shown in FIG. 6, the frame memory unit according to another exemplary embodiment of the present invention includes an address comparator 735, a pixel-address matching unit 736, a frame memory 737, and a data synthesizer 738.

Using the write address signal (WA), the left/right selection signal (S) and the read activation signal (W), the address comparator 735 respectively records the input left-eye 3D image data and right-eye 3D image data at left-eye and right-eye image areas having corresponding addresses in the frame memory 737 similar to the address comparator 731 of FIG. 5.

However, the address comparator 735 of FIG. 6 is different from the address comparator 731 of FIG. 5 in that in response to an address comparison determination signal, corresponding left-eye and right-eye image areas in the frame memory are determined. In more detail, when the input address comparison determination signal corresponds to the horizontal direction, the address comparator 735 divides the frame memory into the left-eye and right-eye image areas along the horizontal direction as shown in FIG. 6, and stores the input left-eye and right-eye 3D image data at the respectively divided left-eye and right-eye image areas. On the other hand, when the input address comparison determination signal corresponds to the vertical direction, the address comparator 735 divides the frame memory into the left-eye and right-eye image areas along the vertical direction, and stores the input left-eye and right-eye 3D image data at the respectively divided left-eye and right-eye image areas. It is exemplarily shown that in response to the input address comparison determination signal, the address comparator 735 divides the frame memory into the left-eye and right-eye image areas along the horizontal or vertical direction. However it should be understood that the present invention is not limited thereto.

The address comparator 735 may divide the frame memory 737 into the left-eye and right-eye image areas depending on the arrangement of the left-eye and right-eye pixels of the display unit 100. That is, the arrangement of the left-eye and right-eye pixels of the display unit 100 may determine the arrangements of the left-eye and right-eye image areas of the frame memory 737.

In response to the read address signal (RA), the pixel-address matching unit 736 reads an address from the frame memory 737 and transmits the frame data to the data synthesizer 738 by matching the image data recorded in the left-eye image area (hereinafter, 'left-eye image data') with the left-eye pixels in the case where the address corresponds to the left-eye image area, and transmits the frame data to the data synthesizer 738 by matching the image data recorded in the right-eye image area (hereinafter, 'right-eye image data') with the right-eye pixels in the case where the address corresponds to the right-eye image area. Meanwhile, the left-eye pixels and the right-eye pixels of the display unit 100 may be arranged such that the respective left-eye pixels and the right-eye pixels include a part of the color subpixels. In this case, the pixel-address matching unit 736 matches the left-eye image data and the right-eye image data in correspondence with the arrangements of the subpixels of the display unit 100 by dividing the left-eye image data and the right-eye image data according to the colors and transmits the matched left-eye image data and the right-eye image data to the data synthesizer 738.

The frame memory 737 includes the left-eye and right-eye image areas, and the left-eye and right-eye image areas of the frame memory 737 respectively store the left-eye and right-eye 3D image data. It is exemplarily shown that the number of left-eye and right-eye image area frame memories is given as 2 (i.e., one left-eye image area and one right-eye image area). However it should be understood that the present invention is not limited thereto. The data synthesizer 738 can independently and simultaneously (or concurrently) read the left-eye and right-eye image areas of the frame memory 737. Accordingly, the data synthesizer 738 can synthesize stereoscopic image data by simultaneously (or concurrently) reading the left-eye and right-eye image data from the left-eye and right-eye image areas and arranging the left-eye and right-eye image data.

The data synthesizer 738 synthesizes the stereoscopic image data by arranging the left-eye and right-eye image data matched with the left-eye and right-eye pixels by the pixel-address matching unit 736 in correspondence with the arrangement of the left-eye and right-eye pixels of the display unit 100, and transmits the synthesized stereoscopic image data to the data driver 300.

The stereoscopic image display device according to an exemplary embodiment of the present invention may be applicable to a mobile communication terminal or a personal digital assistant (PDA), as well as to a large display device such as a plasma TV and a monitor display device.

In addition, the stereoscopic image display device according to another exemplary embodiment of the present invention may include a mode converter (not shown). In this case, the mode converter controls the liquid crystal arrangement of the barrier 100' in response to a mode signal input from the timing controller 600. The mode signal may be set to be generated in response to the stereoscopic image activation signal. In more detail, when the stereoscopic image activation signal is applied, the timing controller 600 generates a mode signal and transmits the generated mode signal to the mode converter, and the mode converter generates the opaque regions 150' by controlling the liquid crystal arrangement of the barrier 100' in response to the input mode signal. The data converter 700 converts the input 3D image into image data corresponding to an arrangement of the left-eye and right-eye pixels so as to transmit the converted image data to the data driver 300, and the data driver 300 displays the stereoscopic image by respectively applying the stereoscopic image data to the corresponding left-eye and right-eye pixels. On the contrary, when the stereoscopic image activation signal is not applied, the barrier 100' does not generate the opaque regions 150', the data converter 700 converts the input 3D image into a plane image data signal and transmits the plane image data signal to the data driver 300, and the data driver 300 displays a plane image by applying the plane image data to the corresponding pixels.

The frame memory unit of FIG. 6 according to another exemplary embodiment of the present invention may control the left-eye and right-eye image areas of the frame memory in response to the address comparison determination signal. Therefore, a stereoscopic image display device including the frame memory unit of FIG. 6 may change the arrangement of left-eye and right-eye image areas depending on the arrangement of the left-eye pixels and right-eye pixels. In more detail, a stereoscopic image display device that displays a stereoscopic image when the arrangement of the left-eye and right-eye image areas is perpendicularly changed is exemplarily described. According to such a stereoscopic image display device, when the display unit 100 and the barrier 100' are rotated 900, the arrangement of the left-eye and right-eye pixel areas of the display unit 100 and the arrangement of the transparent regions 160' and opaque regions 150' of the barrier 100' may be perpendicularly changed. By way of example, the left-eye and right-eye pixels are rearranged (or re-assigned) such that the left-eye and right-eye pixels are alternately arranged in the horizontal direction (i.e., a direction parallel to a line between the left and right eyes) after the 90° rotation. Similarly, the transparent and opaque regions are also rearranged to alternate in the horizontal direction after the 90° rotation. In this case, in response to the address comparison determination signal, the frame memory unit of FIG. 6 may correspond to the perpendicular arrangements of the left-eye and right-eye pixels by dividing the left-eye and right-eye image areas along the horizontal or vertical direction.

As described above, the data converter 700 of the stereoscopic image display device according to the exemplary embodiments of the present invention may display the stereoscopic image by converting 3D image contents for the plane image into the stereoscopic image data in real time when the 3D image contents for the plane image are input.

Therefore, with the stereoscopic image display device, the 3D image contents for the plane image may not necessarily be converted into stereoscopic image data externally.

Such a data converter (or graph accelerator chip) may be applied regardless of the arrangement of the left-eye and right-eye pixels of the display unit. Therefore, the development of the data converters that depend on the arrangements of the left-eye and right-eye pixels of the display unit may not be desired or needed.

In addition, the data converter according to an exemplary embodiment of the present invention can generate stereoscopic image data corresponding to various arrangements of the left-eye and right-eye pixels even when the arrangements of the left-eye and right-eye pixels are changed by the rotation of the display unit. In addition, the stereoscopic image display device according to an exemplary embodiment of the present invention can convert the plane image data to the stereoscopic image data in real time even when the 3D image contents are input only as plane image data.

While the present invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A stereoscopic image display device comprising:
a display unit comprising a plurality of pixels arranged in a matrix format, the plurality of pixels comprising left-eye pixels and right-eye pixels alternately arranged in one direction;
a memory comprising a plurality of left-eye image areas for storing left-eye image data corresponding to the left-eye pixels and a plurality of right-eye image areas for storing right-eye image data corresponding to the right-eye pixels, the left-eye image areas and the right-eye image areas being alternately and repeatedly arranged;
an address comparator for storing the left-eye image data and the right-eye image data at corresponding addresses of the left-eye image areas and the right-eye image areas, respectively, and changing an arrangement of the left-eye image areas and the right-eye image areas in the memory from a first arrangement to a second arrangement or from the second arrangement to the first arrangement in accordance with a first signal indicative of a change of a physical orientation of the display unit, wherein, in the first arrangement, the left-eye image areas and the right-eye image areas alternate along a first direction and, in the second arrangement, the left-eye image areas and the right-eye image areas alternate along a second direction perpendicular to the first direction;
a data synthesizer for synthesizing a stereoscopic image signal from the left-eye image data and the right-eye image data stored in the memory; and
a data driver for applying a data signal corresponding to the stereoscopic image signal to the display unit.

2. The stereoscopic image display device of claim 1, wherein the arrangement of the left-eye image areas and the right-eye image areas corresponds to an arrangement of the left-eye pixels and the right-eye pixels of the display unit.

3. The stereoscopic image display device of claim 1, wherein, in accordance with the first signal, the address comparator changes the arrangement of the left-eye image areas and the right-eye image areas of the memory in correspondence with an arrangement of the left-eye pixels and the right-eye pixels of the display unit.

4. The stereoscopic image display device of claim 1, wherein an arrangement of the left-eye pixels and the right-eye pixels of the display unit is perpendicularly changed when the arrangement of the left-eye image areas and the right-eye image areas of the memory is changed from the first direction to the second direction.

5. The stereoscopic image display device of claim 1, further comprising a pixel-address matching unit for matching the left-eye image data with the left-eye pixels and the right-eye image data with the right-eye pixels, and transmitting matched data among the left-eye image data and the right-eye image data to the data synthesizer.

6. The stereoscopic image display device of claim 5, wherein the data synthesizer synthesizes the stereoscopic image signal by arranging the left-eye image data and the right-eye image data matched by the matching unit in correspondence with an arrangement of the left-eye pixels and the right-eye pixels of the display unit.

7. The stereoscopic image display device of claim 1, wherein:
each of the left-eye pixels and the right-eye pixels comprises a first subpixel, a second subpixel, and a third subpixel respectively corresponding to first, second, and third colors; and
data respectively corresponding to the first subpixel, the second subpixel, and the third subpixel are dividedly stored in the left-eye image areas and the right-eye image areas.

8. The stereoscopic image display device of claim 1, further comprising a barrier comprising transparent and opaque regions arranged to form a light projection path so that images output by the left-eye pixels and the right-eye pixels can respectively be projected in a left direction or a right direction through the light projection path.

9. The stereoscopic image display device of claim 8, wherein the transparent and opaque regions of the barrier are rearranged when the left-eye pixels and the right-eye pixels of the display unit are rearranged.

10. The stereoscopic image display device of claim 1, wherein the stereoscopic image display device is a display unit of a mobile communication terminal.

11. A 3D image-stereoscopic image converter for converting 3D image data to stereoscopic image data corresponding to an arrangement of left-eye pixels and right-eye pixels of a display unit, comprising:
 a geometric engine for converting the 3D image data to left-eye 3D image data or right-eye 3D image data in accordance with a stereoscopic image activation signal;
 a memory comprising a plurality of left-eye image areas for storing the left-eye 3D image data corresponding to the left-eye pixels and a plurality of right-eye image areas for storing the right-eye 3D image data corresponding to the right-eye pixels, the left-eye image areas and the right-eye image areas being alternately and repeatedly arranged;
 a rendering engine for recording the left-eye 3D image data and the right-eye 3D image data at the memory by utilizing spatial information and color information of the left-eye 3D image data and the right-eye 3D image data;
 an address comparator for storing the left-eye 3D image data and the right-eye 3D image data input from the rendering engine at corresponding addresses of the left-eye image areas and the right-eye image areas, respectively, and changing an arrangement of the left-eye image areas and the right-eye image areas in the memory from a first arrangement to a second arrangement or from the second arrangement to the first arrangement in accordance with a first signal indicative of a change of a physical orientation of the display unit, wherein, in the first arrangement, the left-eye image areas and the right-eye image areas alternate along a first direction and, in the second arrangement, the left-eye image areas and the right-eye image areas alternate along a second direction perpendicular to the first direction; and
 a data synthesizer for synthesizing a stereoscopic image signal from the left-eye 3D image data and the right-eye 3D image data stored in the memory.

12. The 3D image-stereoscopic image converter of claim 11, wherein the arrangement of the left-eye image areas and the right-eye image areas corresponds to the arrangement of the left-eye pixels and the right-eye pixels of the display unit.

13. The 3D image-stereoscopic image converter of claim 11, wherein in accordance with the first signal, the address comparator changes the arrangement of the left-eye image areas and the right-eye image areas of the memory in correspondence with the arrangement of the left-eye pixels and the right-eye pixels of the display unit.

14. The 3D image-stereoscopic image converter of claim 11, further comprising a pixel-address matching unit for matching the left-eye 3D image data with the left-eye pixels and the right-eye 3D image data with the right-eye pixels, and transmitting matched data among the left-eye 3D image data and the right-eye 3D image data to the data synthesizer.

15. The 3D image-stereoscopic image converter of claim 14, wherein the data synthesizer synthesizes the stereoscopic image data by arranging the left-eye 3D image data and the right-eye 3D image data matched by the matching unit in correspondence with the arrangement of the left-eye pixels and the right-eye pixels of the display unit.

16. A stereoscopic image display device comprising:
 a display unit comprising a plurality of pixels, the pixels being adapted to be arranged into left-eye pixels and right-eye pixels that are alternately arranged in one direction in accordance with a spatial orientation of the display unit; and
 a data converter adapted to receive image data and to convert the image data into stereoscopic image data comprising left-eye image data and right-eye image data, the data converter comprising a memory adapted to be arranged into a plurality of left-eye image areas for storing the left-eye image data corresponding to the left-eye pixels and a plurality of right-eye image areas for storing the right-eye image data corresponding to the right-eye pixels, the left-eye image areas and the right-eye image areas being alternately and repeatedly arranged,
 wherein the left-eye image areas and the right-eye image areas of the memory are arranged according to a physical orientation of the display unit,
 wherein the memory is adapted to change an arrangement of the left-eye image areas and the right-eye image areas from a first arrangement to a second arrangement or from the second arrangement to the first arrangement in response to a change of the physical orientation of the display unit, and
 wherein, in the first arrangement, the left-eye image areas and the right-eye image areas alternate along a first direction and, in the second arrangement, the left-eye image areas and the right-eye image areas alternate along a second direction perpendicular to the first direction.

17. The stereoscopic image display device of claim 16, further comprising means for directing light from the left-eye pixels toward a left eye of a user and for directing light from the right-eye pixels toward a right eye of the user.

18. The stereoscopic image display device of claim 16, wherein the data converter converts the image data into the stereoscopic image data when it receives a stereoscopic image activation signal.

* * * * *